US010355600B1

(12) United States Patent
Chiu

(10) Patent No.: US 10,355,600 B1
(45) Date of Patent: Jul. 16, 2019

(54) POWER CONVERTER

(71) Applicant: Chicony Power Technology Co., Ltd., New Taipei (TW)

(72) Inventor: Huan-Chih Chiu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/208,577

(22) Filed: Dec. 4, 2018

(30) Foreign Application Priority Data

Oct. 29, 2018 (TW) .............................. 107138214 A

(51) Int. Cl.
*H02M 3/335* (2006.01)
*H02M 1/32* (2007.01)
*G03G 15/00* (2006.01)

(52) U.S. Cl.
CPC .... *H02M 3/33507* (2013.01); *G03G 15/5004* (2013.01); *H02M 1/32* (2013.01); *G03G 15/80* (2013.01); *H02M 2001/322* (2013.01)

(58) Field of Classification Search
CPC ............................ H02M 3/33507; H02M 1/32; G03G 15/5004; G03G 15/80
See application file for complete search history.

(56) References Cited

U.S. PATENT DOCUMENTS

| 8,593,837 | B2 | 11/2013 | Hong |
| 8,953,347 | B2 * | 2/2015 | Jin ..................... H02M 7/217 363/44 |
| 9,246,402 | B2 | 1/2016 | Sakurai et al. |
| 2013/0170261 | A1 | 7/2013 | Lee et al. |

FOREIGN PATENT DOCUMENTS

| CN | 103227496 | 4/2015 |
| CN | 106159922 | 11/2016 |
| CN | 104242631 | 8/2017 |
| EP | 2704281 | 3/2014 |
| TW | 200637107 | 10/2006 |
| TW | 201111970 | 4/2011 |
| TW | 201119172 | 6/2011 |
| TW | I423575 | 1/2014 |
| TW | 201416845 | 5/2014 |
| TW | 201603457 | 1/2016 |
| TW | I574493 | 3/2017 |
| WO | 2009046202 | 4/2009 |

OTHER PUBLICATIONS

"Office Action of Taiwan Counterpart Application," dated Apr. 12, 2019, pp. 1-6.

* cited by examiner

*Primary Examiner* — Adolf D Berhane
*Assistant Examiner* — Afework S Demisse
(74) *Attorney, Agent, or Firm* — JCIPRNET

(57) ABSTRACT

A power converter is provided. The power converter is used to drive a load. The power converter includes an energy storage element for storing a converted power. The power converter provides a determination signal according to a level of an input power, and provides a first notification signal to the load according to the determination signal. The power converter provides a control signal and an enable signal when receiving a second notification signal from the load. The power converter selectively provides the enable signal according to the determination signal, and selectively absorbs a power of the energy storage element according to the enable signal.

11 Claims, 3 Drawing Sheets

POWER CONVERTER

CROSS-REFERENCE TO RELATED APPLICATION

This application claims the priority benefit of Taiwan application serial no. 107138214, filed on Oct. 29, 2018. The entirety of the above-mentioned patent application is hereby incorporated by reference herein and made a part of this specification.

BACKGROUND OF THE INVENTION

1. Field of the Invention

The invention relates to a power converter, and more particularly, relates to a power converter for discharging an energy storage element of the power converter when the power is insufficient.

2. Description of Related Art

In the prior art, under normal operation of the power converter, the energy storage element of the power converter may store a power with high voltage, and the voltage of the power may be as high as 360 to 420V. However, when the power is off or the power is insufficient, it would take a long period of time for a large capacitor to be naturally consumed if there is lack of a circuit with discharge mechanism. If a person accidentally touches it during that period, that person may suffer serious injury as caused electric shock. In addition, when the power is off or the power is insufficient in the prior art, if the energy storage element is discharged immediately while a load has not yet complete the corresponding operation, the power at the load will be insufficient. Consequently, data loss can occur on the load or a mechanism status of the load cannot be reset.

SUMMARY OF THE INVENTION

The invention provides a power converter configured to notify the load to execute a pre-shutdown operation when the power is off or the power is insufficient, and absorb energy stored by the energy storage element after the pre-shutdown operation is completed by the load.

A power converter of the invention is configured to drive a load. The power converter includes an input circuit, an energy storage element, a DC conversion circuit, a determination module, a secondary power supply, a switch module and an energy absorption module. The input circuit is configured to receive an input power and convert the input power to generate a converted power. The energy storage element is coupled to the input circuit. The energy storage element is configured to store the converted power. The DC conversion circuit is coupled to the energy storage element. The DC conversion circuit is configured to convert the converted power into at least one DC power and provide the at least one DC power to the load. The determination circuit is coupled to the input circuit, and provides a determination signal according to the input power. The secondary power supply is coupled to the determination circuit, the energy storage element and the load. The secondary power supply receives the converted power as a driving power, provides a first notification signal to the load according to the determination signal and provides a control signal and an enable signal when receiving a second notification signal from the load. The switch module is coupled to the secondary power supply. The switch module is configured to receive the control signal and the enable signal, and selectively provide the enable signal according to the control signal. The energy absorption module is coupled to the switch module and the energy storage element. The energy absorption module is configured to receive the enable signal and selectively absorb the converted power of the energy storage element according to the enable signal.

Based on the above, the power converter of the invention provides the determination signal according to the level of the input power source, and provides the first notification signal to the load according to the determination signal. The power converter can notify the load to perform the pre-shutdown operation by the first notification signal. After completing the pre-shutdown operation, the load provides the second notification signal to the power converter. The power converter selectively provides the enable signal according to the determination signal, and selectively absorbs the power of the energy storage element according to the enable signal. As a result, when the power is off or the power is insufficient, the load can still complete the pre-shutdown operation and the risk of electric shock can be reduced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
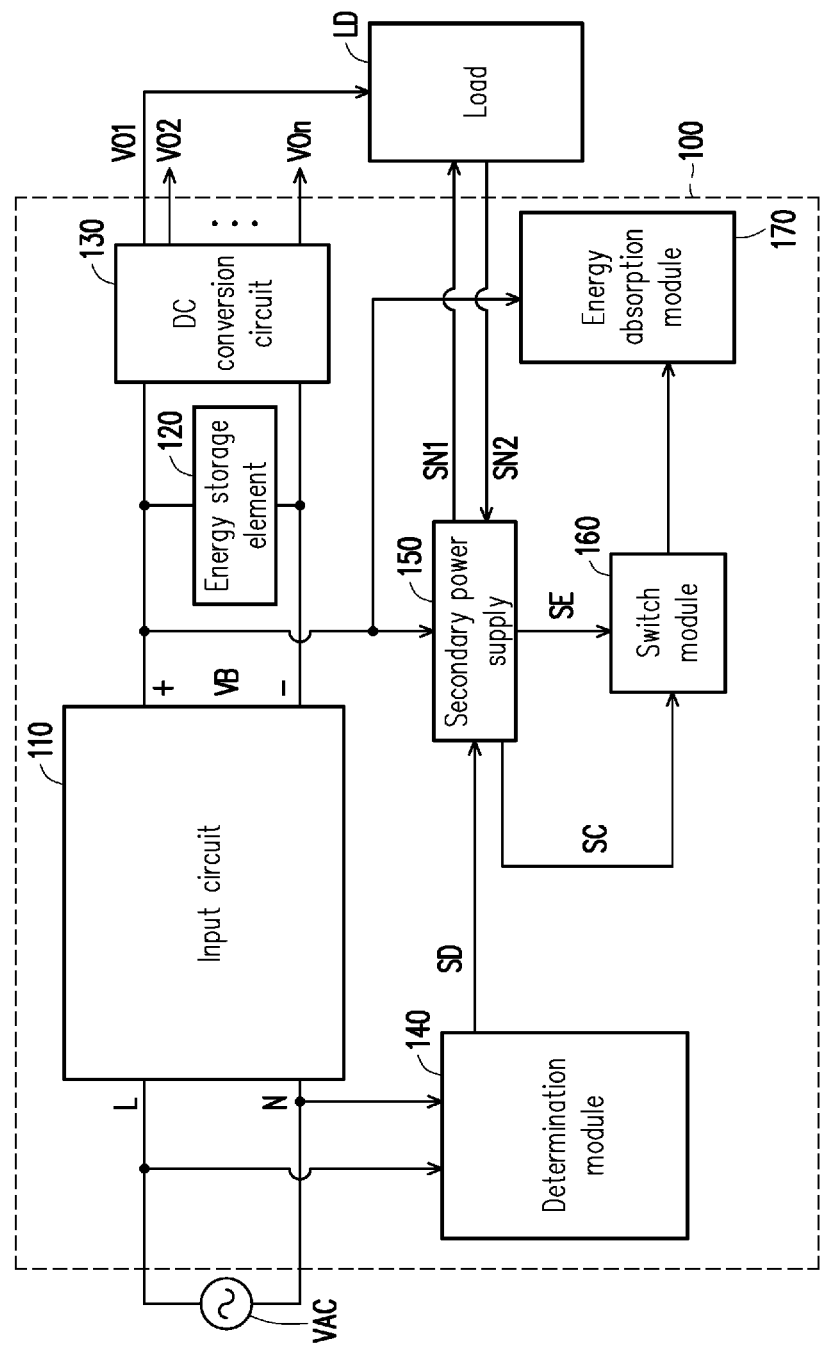
FIG. 1 is a circuit block diagram illustrating a power converter and a load according to a first embodiment of the invention.

With reference to FIG. 1, FIG. 1 is a circuit block diagram illustrating a power converter and a load according to the first embodiment of the invention. A power converter 100 of this embodiment is configured to drive a load LD. The power converter 100 includes an input circuit 110, an energy storage element 120, a DC conversion circuit 130, a determination module 140, a secondary power supply 150, a switch module 160 and an energy absorption module 170. The input circuit 110 has an AC input terminal of a line wire L and a neutral wire N configured to receive an input power VAC and convert the input power VAC to generate a converted power VB. The input power VAC is an external power in form an alternating current, whereas the converted power VB is a direct current power. The energy storage element 120 is coupled to the input circuit 110. The energy storage element 120 is configured to store the converted power VB. The energy storage element 120 of this embodiment may be implemented by any form of double electrode plate energy storage element capable of storing a high voltage power (e.g., 360V to 420V). The DC conversion circuit 130 is coupled to the energy storage element 120. The DC conversion circuit 130 is configured to convert the converted power VB into DC powers VO1 to VOn, and at least provide one of the DC powers VO1 to VOn to the load LD. The load LD of this embodiment is driven by the DC power VO1. Voltage levels of the DC powers VO1 to VOn may be identical or different. The number of the DC powers of the invention may be one or more, and is not limited to this embodiment.

In this embodiment, the determination module 140 is coupled to the input circuit 110. The determination module 140 can provide a determination signal SD of the corresponding voltage level according to the input power VAC. The secondary power supply 150 is coupled to the determination module 140, the energy storage element 120 and the load LD. The secondary power supply 150 receives the converted power VB as a driving power of the secondary power supply 150. In other words, the converted power VB stored by the energy storage element 120 may be used to drive the secondary power supply 150. The secondary power supply 150 further receives the determination signal SD, provides a first notification signal SN1 to the load LD according to the determination signal SD and waits for a reply from the load LD. When receiving the first notification signal SN1, the load LD performs a pre-shutdown operation. After completing the pre-shutdown operation, the load LD provides a second notification signal SN2 to the secondary power supply 150. In this embodiment, so-called "pre-shutdown operation" may be, for example, a saving operation and/or a resetting operation.

In other words, the determination module 140 can provide the corresponding determination signal SD in correspondence to the voltage level of the input power VAC. Therefore, when the voltage level of the input power VAC is insufficient, the determination module 140 can provide the determination signal SD corresponding to the insufficient voltage level to the secondary power source 150. After receiving the determination signal SD corresponding to the insufficient voltage level, the secondary power supply 150 provides the first notification signal SN1 to the load LD thereby notify the load LD to perform the pre-shutdown operation, so as to prevent the load LD from data loss or prevent a mechanism status of the load LD from being unable to be reset.

In this embodiment, when the secondary power supply 150 provides a control signal SC and an enable signals SE in response to the second notification signal SN2 received from the load LD, it means that the pre-shutdown operation is completed by the load LD. The switch module 160 is coupled to the secondary power supply 150. The switch module 160 is configured to receive the control signal SC and the enable signal SE, and selectively provide the enable signal SE according to the control signal SC. In other words, the switch module 160 provides the enable signal SE according to the control signal SC corresponding to the insufficient voltage level of the input power VAC. The energy absorption module 170 is coupled to the switch module 160 and the energy storage element 120. The energy absorption module 170 is configured to receive the enable signal SE and selectively absorb the converted power VB of the energy storage element 120 according to the enable signal SE.

Here, it is worth noting that, when the voltage level of the input power VAC is insufficient, the power converter 100 would provide the first notification signal SN1 to notify the load LD to perform the pre-shutdown operation. After knowing that the pre-shutdown operation is completed by the load LD according to the second notification signal SN2, the power converter 100 absorbs the converted power VB of the energy storage element 120. In this way, not only can the load LD be prevented from data loss, the mechanism status of the load LD may also be prevented from being unable to reset while also preventing injury caused by electric shock.

It is also worth noting that, the secondary power supply 150 uses the converted power VB stored by the energy storage element 120 as the driving power of the secondary power supply 150. Therefore, the secondary power supply 150 would not immediately stop operating when the voltage level of the input power VAC is insufficient. The secondary power supply 150 can maintain operating for a longer period of time with the converted power VB of the energy storage element 120 after the input power VAC is off, and can stop operating only when the converted power VB of the energy storage element 120 is completely absorbed (or completely discharged). As such, the secondary power supply 150 may be regarded as an element that continuously monitors the power of the energy storage element 120. Therefore, the invention can ensure that its power converter discharges only at the appropriate time without being discharged too early or too late.

Figure 2:
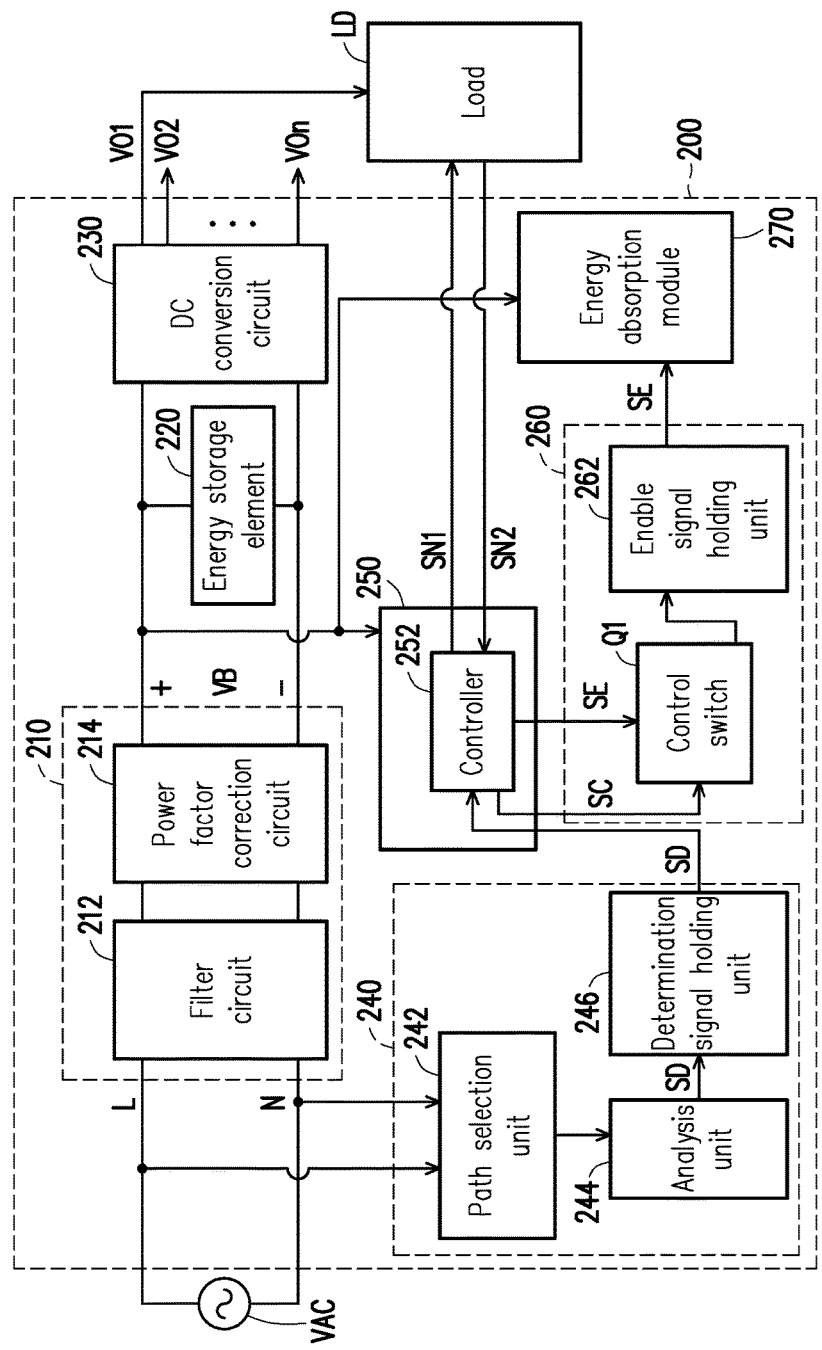
FIG. 2 is a circuit block diagram illustrating a power converter and a load according to a second embodiment of the invention.

With reference to FIG. 2, FIG. 2 is a circuit block diagram illustrating a power converter and a load according to the second embodiment of the invention. In the second embodiment, as similar to the first embodiment, a power converter 200 of the second embodiment includes an input circuit 210, an energy storage element 220, a DC conversion circuit 230, a determination module 240, a secondary power supply 250, a switch module 260 and an energy absorption module 270. The input circuit 210 of this embodiment may include (but not limited to) a filter circuit 212 and a power factor correction circuit 214.

In this embodiment, the determination module 240 includes a path selection unit 242 and an analysis unit 244. The path selection unit 242 is coupled to an AC input terminal of the input circuit 210. The path selection unit 242 is configured to selectively turn on a line wire L or a neutral wire N. The analysis unit 244 is coupled to the path selection unit 242. The analysis unit 244 is configured to provide a determination signal SD according to an energy of the line wire L or the neutral wire N. The analysis unit 244 determines voltage levels of the line wire L and the neutral wire N through the path selection unit 242. When the line wire L and the neutral wire N are both at a low voltage level, the determination signal SD provided by the analysis module 244 is a first determination signal. Conversely, when at least one of the line wire L and the neutral wire N is at a high voltage level, the determination signal SD provided by the analysis unit 244 is a second determination signal.

In this embodiment, the determination module 240 further includes a determination signal holding unit 246. The determination signal holding unit 246 is coupled to the analysis unit 244 and the secondary power supply 250. The determination signal holding unit 246 is configured to filter a noise of the determination signal SD and hold the determination signal SD stable, so as to prevent the secondary power supply 250 from erroneous actions due to the noise or unstable level of the determination signal SD.

The secondary power supply 250 includes a controller 252. The controller 252 is coupled to the determination module 240 and the load LD. The controller 252 is configured to receive the determination signal SD. When receiving the first determination signal, the controller 252 provides the first notification signal SN1 to the load LD thereby instruct the load LD to perform an operation (e.g., the related pre-shutdown operation). After sending the first notification signal SN1, the controller would wait for a reply from the load LD. When receiving the reply from the load LD after the operation is completed (i.e., when receiving the second notification signal SN2 replied by the load LD), the controller 225 provides a control signal SC and an enable signal SE. The enable signal SE provided by the controller 252 is a signal with a high logic level in this embodiment.

Conversely, when receiving the determination signal SD being the second determination signal, the controller 252 does not provide the first notification signal SN1 to the load LD.

In this embodiment, the switch module 260 includes a control switch Q1. A first terminal of the control switch Q1 is coupled to one terminal of the controller 252 to receive the enable signal SE. A control terminal of the control switch Q1 is coupled to another terminal of the controller 252 to receive the control signal SC corresponding to the first determination signal and thereby turn on the first terminal and a second terminal of the control switch Q1. At this time, the enable signal SE is provided to the energy absorption module 270 by the second terminal of the control switch Q1. On other hand, when receiving the control signal SC corresponding to the second determination signal, the control terminal of the control switch Q1 turns off the first terminal and the second terminal of the control switch Q1.

The switch module 260 further includes an enable signal holding unit 262. The enable signal holding unit 262 is coupled to the second terminal of the control switch Q1 to receive the enable signal SE. The enable signal holding unit 262 is configured to filter a noise of the enable signal SE and hold the enable signal SE stable, so as to prevent the energy absorption module 270 from erroneous actions due to the noise or unstable level of the enable signal SE.

In this embodiment, implementation details of the energy storage element 220, the DC conversion circuit 230 and the energy absorption module 270 may be sufficiently taught by the energy storage element 120, the DC conversion circuit 130 and the energy absorption module 170 in the first embodiment, which are not repeated hereinafter.

Figure 3:
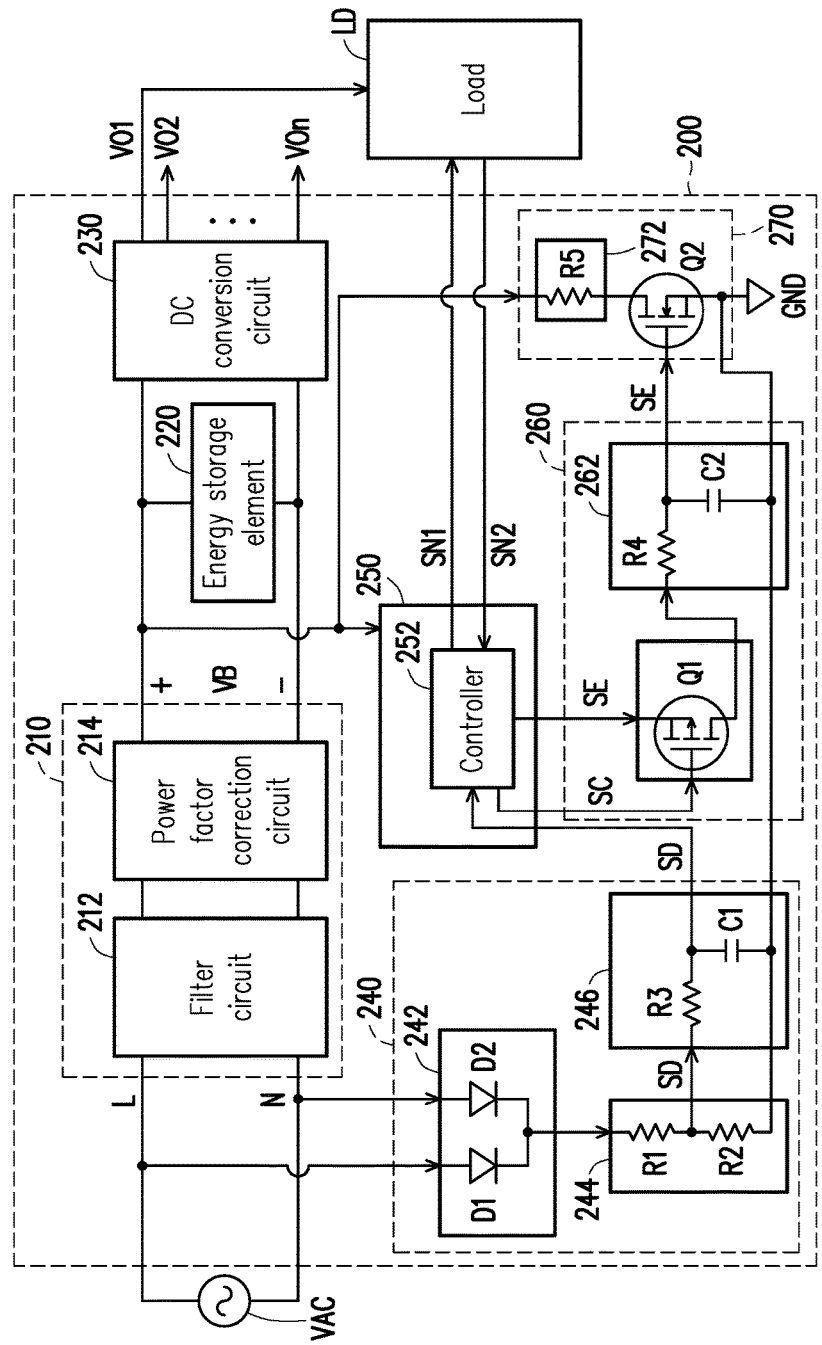
FIG. 3 is a circuit schematic diagram illustrating the power converter according to the second embodiment of the invention.

Further, a circuit scheme of the second embodiment of the invention is explained as follows. With reference to FIG. 3, FIG. 3 is a circuit schematic diagram illustrating the power converter according to the second embodiment of the invention. In FIG. 3, the path selection unit 242 includes a first path selection switch D1 and a second path selection switch D2. A first terminal of the first path selection switch D1 is an anode coupled to the line wire L. A second terminal of the first path selection switch D1 is a cathode coupled to the analysis unit 244. A first terminal of the second path selection switch D2 is an anode coupled to the neutral wire N. A second terminal of the second path selection switch D2 is a cathode coupled to the analysis unit 244. The first path selection switch D1 and the second path selection switch D2 of this embodiment are implemented by using diodes. The analysis unit 244 includes a first resistor R1 and a second resistor R2. A first terminal of the first resistor R1 is coupled to the second terminal of the first path selection switch D1 and the second terminal of the second path selection switch D2. A second terminal of the first resistor R1 is coupled to the determination signal holding unit 246. The analysis unit 244 provides the determination signal SD to the determination signal holding unit 246 via the second terminal of the first resistor R1. A first terminal of the second resistor R2 is coupled to the second terminal of the first resistor R1 and a second terminal of the second resistor R2 is coupled to a reference power. The reference power may be, for example, a ground GND or system low voltage.

In general, when the input power VAC is operating normally, one of the line wire L or the neutral wire N would have a higher voltage level. For instance, when the voltage level on the line wire L is greater than a threshold voltage value of the first path selection switch D1, the first path selection switch D1 is turned on to introduce an energy of the input power VAC into the analysis unit 244. At this time, the voltage level on the neutral wire N is lower than a threshold voltage value of the second path selection switch D2 so that the second path selection switch D2 is turned off. As another example, when the voltage level on the line wire L is less than the threshold voltage value of the first path selection switch D1, the first path selection switch D1 is turned off. At this time, the voltage level on the neutral wire N is higher than the threshold voltage value of the second path selection switch D2, and the second path selection switch D2 is turned on to introduce the energy of the input power VAC into the analysis unit 244. In other words, when the input power VAC is operating normally, the path selection unit 242 introduces the energy of the input power VAC into the analysis unit 244.

On the other hand, when the voltage level of the input power VAC is insufficient, the line wire L and the neutral wire N both would have a lower voltage level. When the voltage level of the input power VAC is insufficient, that is, when the voltage level of the input power VAC is lower than the threshold voltage value of the first path selection switch D1 and the threshold voltage value of the second path selection switch D2, the first path selection switch D1 and the second path selection switch D2 are both turned off. Accordingly, the path selection unit 242 does not introduce the energy of the input power VAC into the analysis unit 244.

In certain embodiments, the first path selection switch D1 and the second path selection switch D2 may be implemented by using a transistor switch with a comparator circuit.

The analysis unit 244 can analyze the energy of the input power VAC so as to provide the determination signal SD of different voltage levels according to the energy of the input power VAC. When the input power VAC is insufficient, the analysis unit 244 cannot receive the energy of the input power VAC provided by the path selection unit 242 via the first terminal of the first resistor R1. The analysis unit 244 provides the determination signal SD with a low voltage level (the voltage level approximate to or equal to zero) as the first determination signal.

On the other hand, when input power VAC is operating normally, the analysis unit 244 can receive the energy of the input power VAC provided by the path selection unit 242. The analysis unit 244 decides the high voltage level of the determination signal SD according to a resistance of the first resistor R1, a resistance of the second resistor R2 and the energy of the input power VAC. Therefore, when the input power VAC is operating normally, the analysis unit 244 provides the determination signal SD with the high voltage level as the second determination signal via the second terminal of the first resistor R1.

The determination signal holding unit 246 includes a first holding resistor R3 and a first holding capacitor C1. A first terminal of the first holding resistor R3 is coupled to the second terminal of the first resistor R1, and a second terminal of the first holding resistor R3 is coupled to the secondary power supply 250. A first terminal of the first holding capacitor C1 is coupled to the second terminal of the first holding resistor R3, and a second terminal of the first holding capacitor C1 is coupled to the reference power. The determination signal holding unit 246 can filter the noise of the determination signal SD and hold the voltage level of the determination signal SD stable by a combination of the first holding resistor R3 and the first holding capacitor C1.

In this embodiment, the control switch Q1 of the switch module 260 may be implemented by using a P-type MOS-FET (Metal-Oxide-Semiconductor Field-Effect Transistor). The first terminal (source) of the control switch Q1 is coupled to the secondary power supply 250 to receive the enable signal SE from one terminal of the controller 252. The control terminal (gate) of the control switch Q1 is coupled to another terminal of the controller 252 to receive the control signal SC corresponding to the first determination signal or the second determination signal. Since the first determination signal is at the low voltage level, the control switch Q1 would be turned on by the control signal SC corresponding to the first determination signal. Therefore, when receiving the control signal SC corresponding to the first determination signal, the control terminal of the control switch Q1 can provide the enable signal SE to the enable signal holding unit 262 via the second terminal (drain) of the control switch Q1.

On the other hand, the first terminal and the second terminal of the control switch Q1 would be turned off by the control signal SC corresponding to the second determination signal. Therefore, the control switch Q1 does not provide the enable signal SE to the enable signal holding unit 262.

The enable signal holding unit 262 includes a second holding resistor R4 and a second holding capacitor C2. A first terminal of the second holding resistor R4 is coupled to the second terminal of the control switch Q1. A second terminal of the second holding resistor R4 is coupled to the energy absorption module 270. A first terminal of the second holding capacitor C2 is coupled to the second terminal of the second holding resistor R4. A second terminal of the second capacitor C2 is coupled to the reference power. The enable signal holding unit 262 can filter the noise of the enable signal SE and hold the voltage level of the enable signal SE stable by a combination of the second holding resistor R4 and the second holding capacitor C2.

The energy absorption module 270 includes an energy absorption unit 272 and an energy absorption switch Q2. The energy absorption unit 272 is coupled to the energy storage element 220. A first terminal of the energy absorption switch Q2 is coupled to the energy absorption unit 272. A second terminal of the energy absorption switch Q2 is coupled to the reference power. A control terminal of the enable absorption switch Q2 is coupled to the switch module 260 to receive the enable signal SE. The energy absorption switch Q2 of this embodiment may be implemented by using an N-type MOSFET. The first terminal (drain) of the energy absorption switch Q2 is coupled to the energy absorption unit 272. The control terminal (gate) of the enable absorption switch Q2 is coupled to the switch module 260 to receive the enable signal SE. Since the enable signal SE is the signal with the high logic level, when the energy absorption switch Q2 is turned on by the enable signal SE with the high logic level, the energy absorption unit 272 can absorb the converted power VB stored in the energy storage element 220 so as to release the converted power VB stored in the energy storage element 220.

In this embodiment, the energy absorption unit 272 at least includes an energy absorption resistor R5. The energy absorption resistor R5 can absorb the converted power VB stored in the energy storage element 220 when the energy absorption switch Q2 is turned on. A resistance of the energy absorption resistor R5 may be adjusted as needed, so as to control a speed for absorbing the converted power VB stored by the energy absorption element 220.

According to the voltage level of the input power VAC being insufficient, the power converter 200 of this embodiment can provide the determination signal SD with the low voltage level, i.e., the first determination signal. According to the first determination signal, the secondary power supply 250 provides the first notification signal SN1 to the load LD thereby instruct the load LD to perform the pre-shutdown operation. After completing the operation, the load LD provides the second notification signal SN2 to the secondary power supply 250. The secondary power supply 250 generates the enable signal SE with the high logic level and the control signal SC with the low logic level according to the second notification signal SN2. As can be seen, when the voltage level of the input power VAC is insufficient and the pre-shutdown operation is completed by the load LD, the power converter 200 turns on the energy absorption switch Q2 to absorb the converted power VB stored in the energy storage element 220.

In summary, the power converter of the invention provides the determination signal according to the level of the input power source, and provides the first notification signal to the load according to the determination signal. The power converter provides a control signal and an enable signal when receiving a second notification signal from the load. The power converter selectively provides an enable signal according to the determination signal, and selectively absorbs a power of the energy storage element according to the enable signal. In addition, when the voltage level of the input power is insufficient and the pre-shutdown operation is completed by the load, the power converter turns on the energy absorption switch to absorb the converted power stored by the energy storage element. Therefore, the invention can ensure that its power converter discharges only at the appropriate time without being discharged too early or too late.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power converter, configured to drive a load, and comprising:
    an input circuit, configured to receive an input power and convert the input power to generate a converted power;
    an energy storage element, coupled to the input circuit, and configured to store the converted power;
    a DC conversion circuit, coupled to the energy storage element, and configured to convert the converted power into at least one DC power and provide the at least one DC power to the load;
    a determination circuit, coupled to the input circuit, and providing a determination signal according to the input power;
    a secondary power supply, coupled to the determination circuit, the energy storage element and the load, the secondary power supply receiving the converted power as a driving power, providing a first notification signal to the load according to the determination signal and providing a control signal and an enable signal when receiving a second notification signal from the load;
    a switch module, coupled to the secondary power supply, and configured to receive the control signal and the enable signal and selectively provide the enable signal according to the control signal; and an energy absorption module, coupled to the switch module and the energy storage element, and configured to receive the enable signal and selectively absorb the converted power of the energy storage element according to the enable signal.

2. The power converter according to claim 1, wherein the input circuit has an AC input terminal of a neutral wire and a line wire configured to receive the input power, and the determination module comprises:

a path selection unit, coupled to the AC input terminal, and configured to selectively turn on the neutral wire or the line wire;

an analysis unit, coupled to the path selection unit, and configured to provide the determination signal according to an energy of the neutral wire or the line wire, the determination signal provided by the determination module being a first determination signal when the neutral wire and the line wire are both at a low voltage level; and a determination signal holding unit, coupled to the analysis unit and the secondary power supply, and configured to filter a noise of the determination signal and hold the determination signal stable.

3. The power converter according to claim 2, wherein the path selection unit comprises:

a first path selection switch, a first terminal of the first path selection switch being coupled to the line wire, a second terminal of the first path selection switch being coupled to the analysis unit; and a second path selection switch, a first terminal of the second path selection switch being coupled to the neutral wire, a second terminal of the second path selection switch being coupled to the analysis unit.

4. The power converter according to claim 3, wherein the analysis unit comprises:

a first resistor, a first terminal of the first resistor being coupled to the second terminal of the first path selection switch and the second terminal of the second path selection switch, a second terminal of the first resistor being coupled to the determination signal holding unit; and a second resistor, a first terminal of the second resistor being coupled to the second terminal of the first resistor, a second terminal of the second resistor being coupled to a reference power.

5. The power converter according to claim 4, wherein the determination signal holding unit comprises:

a first holding resistor, a first terminal of the first holding resistor being coupled to the second terminal of the first resistor, a second terminal of the first holding resistor being coupled to the secondary power supply; and a first holding capacitor, a first terminal of the first holding capacitor being coupled to the second terminal of the first holding resistor, a second terminal of the first holding capacitor being coupled to the reference power.

6. The power converter according to claim 2, wherein the switch module comprises:

a control switch, a first terminal of the control switch being coupled to the secondary power supply, the first terminal of the control switch being configured to receive the enable signal, a control terminal of the control switch being coupled to the secondary power supply, the control terminal of the control switch being configured to receive the control signal; and an enable signal holding unit, coupled to a second terminal of the control switch, the enable signal holding unit being configured to filter a noise of the enable signal and hold the enable signal stable.

7. The power converter according to claim 6, wherein the control switch provides the enable signal to the enable signal holding unit when the control switch being turned on according to the control signal.

8. The power converter according to claim 6, wherein the enable signal holding unit comprises:

a second holding resistor, a first terminal of the second holding resistor being coupled to the second terminal of the control switch, a second terminal of the second holding resistor being coupled to the energy absorption module; and a second holding capacitor, a first terminal of the second holding capacitor being coupled to the second terminal of the second holding resistor, a second terminal of the second holding capacitor being coupled to a reference power.

9. The power converter according to claim 2, wherein the secondary power supply comprises:

a controller, coupled to the determination module and the load, the controller providing the first notification signal to the load thereby instruct the load to perform an operation when receiving the first determination signal, the controller providing the control signal and the enable signal when receiving the second notification signal replied by the load after completing the operation, wherein the operation comprises at least one of a saving operation and a resetting operation.

10. The power converter according to claim 2, wherein the energy absorption module comprises:

an energy absorption unit, coupled to the energy storage element; and an energy absorption switch, a first terminal of the energy absorption switch being coupled to the energy absorption unit, a second terminal of the energy absorption switch being coupled to a reference power, a control terminal of the energy absorption switch being coupled to the switch module, the control terminal of the energy absorption switch being configured to receive the enable signal, wherein when the energy absorption switch being turned on by the enable signal, the energy absorption switch makes the energy absorption unit absorb the converted power stored in the energy storage unit.

11. The power converter according to claim 10, wherein the energy absorption unit comprises:

an energy absorption resistor, coupled between the energy storage element and the first terminal of the energy absorption switch.

* * * * *